US011125023B2

(12) United States Patent
Armstrong et al.

(10) Patent No.: US 11,125,023 B2
(45) Date of Patent: Sep. 21, 2021

(54) BEND RESTRICTORS (71) Applicant: Baker Hughes Energy Technology UK Limited, Bristol (GB)

(72) Inventors: Adam Armstrong, Newcastle upon Tyne (GB); Jonathan Harris, Newcastle upon Tyne (GB); Paul Castiaux, Newcastle upon Tyne (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 26 days.

(21) Appl. No.: 16/623,741

(22) PCT Filed: Jun. 5, 2018

(86) PCT No.: PCT/GB2018/051525
§ 371 (c)(1),
(2) Date: Dec. 17, 2019

(87) PCT Pub. No.: WO2019/002806
PCT Pub. Date: Jan. 3, 2019

(65) Prior Publication Data
US 2020/0217146 A1 Jul. 9, 2020

(30) Foreign Application Priority Data
Jun. 27, 2017 (GB) .................................... 1710206

(51) Int. Cl.
*E21B 17/01* (2006.01)
*F16L 3/10* (2006.01)

(52) U.S. Cl.
CPC .......... *E21B 17/017* (2013.01); *E21B 17/012* (2013.01); *F16L 3/10* (2013.01)

(58) Field of Classification Search
CPC ... F16L 57/02; F16L 1/12; F16L 1/235; F16L 3/10; E21B 17/01
See application file for complete search history.

(56) References Cited

U.S. PATENT DOCUMENTS

2012/0304447 A1   12/2012   Smith et al.
2014/0377010 A1   12/2014   Van Belkom
(Continued)

FOREIGN PATENT DOCUMENTS

CN   204739357   11/2015
EP   2700864    2/2014
(Continued)

OTHER PUBLICATIONS

International Search Report and Written Opinion issued in International Application No. PCT/GB2018/051525 dated Sep. 13, 2018.
(Continued)

Primary Examiner — Tara Mayo-Pinnock
(74) Attorney, Agent, or Firm — Troutman Pepper LLP; Ryan Schneider; Christopher Close (57) ABSTRACT An element for a bend restrictor including a first part and a second part which together provide a cavity for receipt of a flexible pipe, in use, the two parts are pivotably connected together at a first portion thereof and are releasably coupled or couplable together at a second portion thereof. Successive elements may be secured together to form a bend restrictor.

18 Claims, 5 Drawing Sheets (56) References Cited

U.S. PATENT DOCUMENTS

| | | | |
|---|---|---|---|
| 2015/0159443 A1 | 6/2015 | Springett et al. | |
| 2017/0107770 A1 | 4/2017 | Harbison et al. | |
| 2017/0234080 A1* | 8/2017 | Wang .................. | E21B 17/02 405/184.1 |

FOREIGN PATENT DOCUMENTS

| | | |
|---|---|---|
| EP | 3073295 A2 | 9/2016 |
| GB | 2492109 | 12/2012 |
| GB | 2540780 A | 2/2017 |

OTHER PUBLICATIONS

Search Report from GB Application No. GB1710206.2 dated Dec. 14, 2017.

\* cited by examiner

BEND RESTRICTORS

The present invention relates to bend restrictors and in particular to an element for a bend restrictor and to a bend restrictor made therefrom.

Traditionally, flexible pipe is utilised to transport production fluids, such as oil and/or gas and/or water, from one location to another. Flexible pipe is particularly useful in connecting a sub-sea location (which may be deep underwater) to a sea level location. The pipe may have an internal diameter of typically up to around 0.6 metres (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers. The pipe may be of the bonded or unbonded types.

API Recommended Practice 17B, 5$^{th}$ Edition, entitled "Recommended Practice for Flexible Pipe", provides guidelines for the design, analysis, manufacture, testing, installation and operation of flexible pipes and flexible pipe systems for onshore, subsea and marine applications.

API Specification 17L1, 1$^{st}$ Edition, entitled "Specification for Flexible Pipe Ancillary Equipment", defines the technical requirements for safe, dimensionally interchangeable flexible pipe ancillary equipment that is designed and manufactured to uniform standards and criteria.

API Recommended Practice 17L2, 1$^{st}$ Edition, entitled "Recommended Practice for Flexible Pipe Ancillary Equipment", provides guidelines for the design, materials selection, analysis, testing, manufacture, handling, transportation, installation and integrity management of flexible pipe ancillary equipment.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross-sectional profile of the wound wires which thus prevent the pipe from collapsing or bursting as a result of pressure are sometimes called pressure-resistant profiles. When pressure armour layers are formed from helically wound wires forming hoop components, the radial forces from outer or inner pressure on the pipe cause the hoop components to expand or contract, putting a tensile load on the wires.

In many known flexible pipe designs the pipe body includes one or more tensile armour layers. The primary loading on such a layer is tension. In high pressure applications, such as in deep and ultra-deep water environments, the tensile armour layer experiences high tension loads from a combination of the internal pressure end cap load and the self-supported weight of the flexible pipe. This can cause failure in the flexible pipe since such conditions are experienced over prolonged periods of time.

Unbonded flexible pipe has been used for deep water (less than 3,300 feet (1,005.84 metres)) and ultra-deep water (greater than 3,300 feet) developments. It is the increasing demand for oil which is causing exploration to occur at greater and greater depths where environmental factors are more extreme. For example, in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result, the need for high levels of performance from the layers of the flexible pipe body is increased.

Flexible pipe may also be used for shallow water applications (for example less than around 500 metres depth) or even for shore (overland) applications.

In some instances, flexible pipes of the above-described type should be protected from over-bending (which may lead to damage to the pipe), for example where the pipe extends over a free span, such as at wellhead connections, rigid pipe crossovers and J-tube exits. Such over-bending would comprise bending the flexible pipe beyond its allowable minimum bend radius (which is determined from the dimensions and composition of the pipe).

Bend restrictors are commonly used to restrict the flexible pipe and mechanically prevent it from over-bending, as detailed in section 4.2.3 of API Recommended Practice 17L2, 1$^{st}$ Edition. Bend restrictors typically consist of a plurality of elements of generally cylindrical shape through the centre of each of which the pipe may extend. A bend restrictor may comprise a metallic or polymeric interface structure, which interfaces with the end fitting at one or both ends of a flexible pipe, to support interlocking bend restrictor elements. Commonly, bend restrictors are installed around a flexible pipe prior to installation of said pipe at a site of use, for example bend restrictors may be installed around a flexible pipe in an on-shore facility prior to installation of the flexible pipe in an off-shore application.

In some instances, the risk of over-bending occurs both during installation of the pipe and also during normal use of the pipe thereafter. However, in some situations, the risk of over-bending occurs only during installation and is absent thereafter.

In some instances, for example during flow of a fluid therethrough, flexible pipes having bend restrictors secured therearound experience relatively higher temperatures than do flexible pipes absent such bend restrictors. This relatively increased temperature is caused by the insulating effect of the bend restrictor against heat generated and/or transmitted within the flexible pipe. Furthermore, increasing the continuous operating temperature of a flexible pipe results in a proportional reduction in the useful service life of that pipe, as described in section 6.3.2 of API Recommended Practice 17L2, 1$^{st}$ Edition.

It is typically desirable for a flexible pipe to have a relatively long service life, such that periodic replacements are minimised, with an associated saving in expense of materials and replacement, along with reduced down-time for the application to which the flexible pipe is attached. Indeed, flexible pipes are generally designed to have a suitably long service life, for example of 20 years or more.

The layers of the flexible pipe should be formed from materials suitable for the pipe's continuous functioning. Section 6.2.2 of API Recommended Practice 17B, 5$^{th}$ Edition describes maximum continuous operating temperatures of commonly used polymers for use in flexible pipe internal pressure sheath applications based on a 20-year service life (in Table 14 of that document). Polymers suitable for use at higher continuous operating temperatures (such as PVDF which can have a maximum continuous operating temperature of +130° C.) are more expensive than are polymeric materials suitable for use at relatively lower continuous operating temperatures (such as HDPE which has a maximum continuous operating temperature of +60° C.). In some instances, it is desirable to form at least some of the layers of a flexible pipe from relatively less expensive materials which may have a relatively lower maximum continuous operating temperature.

When flexible pipes are connected to installations they may generate a tie-in load which may contribute to a reduction in the useful service life of the flexible pipe and/or may result in some situations to an increased risk of damage to the connection and/or installations to which the flexible pipes are connected. The addition of a bend restrictor, which may be necessary only during installation of the flexible pipe, can increase the tie-in load.

According to a first aspect of the present invention there is provided an element for a bend restrictor, the element comprising a first part and a second part which together provide a cavity for receipt of a flexible pipe, in use, the two parts being pivotably connected together at a first portion thereof and being releasably coupled together at a second portion thereof.

In embodiments, in use, the two parts are pivotably connected together at a first portion thereof and may be releasably coupled together at a second portion thereof by a flexible joining member. The flexible joining member is capable of bending to allow the bend restrictor to assume a curved or different shape, other than being substantially straight.

The flexible joining member may be formed from any suitable material that is flexible. The flexible joining member may be formed from a material that is resistant to degradation. For example, the flexible joining member may be formed from a natural material or a synthetic material, a polymer, or a composite material, or a combination of the aforementioned materials.

The cavity has a longitudinal axis along which the flexible pipe, in use, extends. The two parts are pivotably connected along an axis aligned with, e.g. parallel to, the longitudinal axis. The two parts may form a clamshell arrangement.

According to a second aspect of the invention there is provided a method of deploying a flexible pipe, the method comprising securing a bend restrictor around the pipe or pipe segment, locating the pipe or pipe segment at a desired sub-sea location and removing the bend restrictor.

According to a third aspect of the invention there is provided a method of installing an element for a bend restrictor around a flexible pipe, the method comprising the steps of: positioning an element for a bend restrictor in an open condition adjacent a flexible pipe;

moving the element into a closed condition around a portion of the pipe by relatively rotating first and second parts of the element around a pivot therebetween; and releasably coupling the parts of the element together using a removable joining member.

In an embodiment the element has two parts. In another embodiment the element may have more than two parts.

According to a fourth aspect of the invention there is provided a method of uninstalling an element for a bend restrictor from around a flexible pipe, the method comprising the steps of: removing a removable joining member joining first and second parts of an element for a bend restrictor together in a closed condition; and moving the element into an open condition by relatively rotating the first and second parts about a pivot therebetween.

In embodiments, there may be provided a bend restrictor comprising one or more, e.g. plural, elements for a bend restrictor such as those described above. Where plural elements for a bend restrictor are provided they may be linked together, for example sequentially. The one or more, e.g. plural, elements may be coupled by a flexible joining member, e.g. a single flexible joining portion, and/or an integrally formed flexible joining portion that connects more than one, i.e. plural, elements together.

A yet further aspect of the invention provides, in combination, a length of flexible pipe of the bonded or unbonded types, and a bend restrictor, the bend restrictor comprising two or more sequential mutually secured bend restrictor elements, a first bend restrictor element being pivotable with respect to the second bend restrictor element, each of said two or more bend restrictor elements being openable and closable by pivoting a first portion from a respective second portion, the bend restrictor being secured or securable about the length of flexible pipe by means of a single lock member engaging the first bend restrictor element and/or the second bend restrictor element.

The bend restrictor and/or one or more of the elements for a bend restrictor may be positively buoyant. One, some or each element for a bend restrictor may be formed from a buoyant material and/or may comprise a buoyancy means or element. A buoyancy means or element may comprise a compartment, for example for retaining a volume of material of relatively lower density than a fluid within which the element for a bend restrictor may be disposed (e.g. relatively lower density than water). The compartment may be secured to and/or retained at least partially within an element for a bend restrictor.

Certain embodiments of the invention provide the advantage that a bend restrictor can be more readily and rapidly installed or uninstalled around or from around a flexible pipe, which may be of the bonded or unbonded type.

Certain embodiments of the invention provide the advantage that all or some of a bend restrictor can be uninstalled from around a flexible pipe after installation of said pipe at or to a site of use. Accordingly, one or more of the layers of said flexible pipe may be formed from a relatively less expensive material possessing a relatively lower maximum continuous operating temperature materials property than would be necessary had the bend restrictor not been uninstalled from around the flexible pipe.

Certain embodiments of the invention provide the advantage that a bend restrictor may be more readily and rapidly removed from around a flexible pipe when the flexible pipe is disposed in a remote environment and/or an environment presenting impaired accessibility (for example when the flexible pipe with bend restrictor is installed in a sub-sea location).

Certain embodiments of the invention provide the advantage that tie-in loads generated by flexible pipes may be relatively reduced after installation of said flexible pipes with a consequential increase in the useful service life of the flexible pipes and/or reduction in the risk of damage to the connection and/or installations to which the flexible pipes are connected.

Embodiments of the invention are further described hereinafter with reference to the accompanying drawings, in which.

In the drawings like reference numerals refer to like parts.

Figure 1:
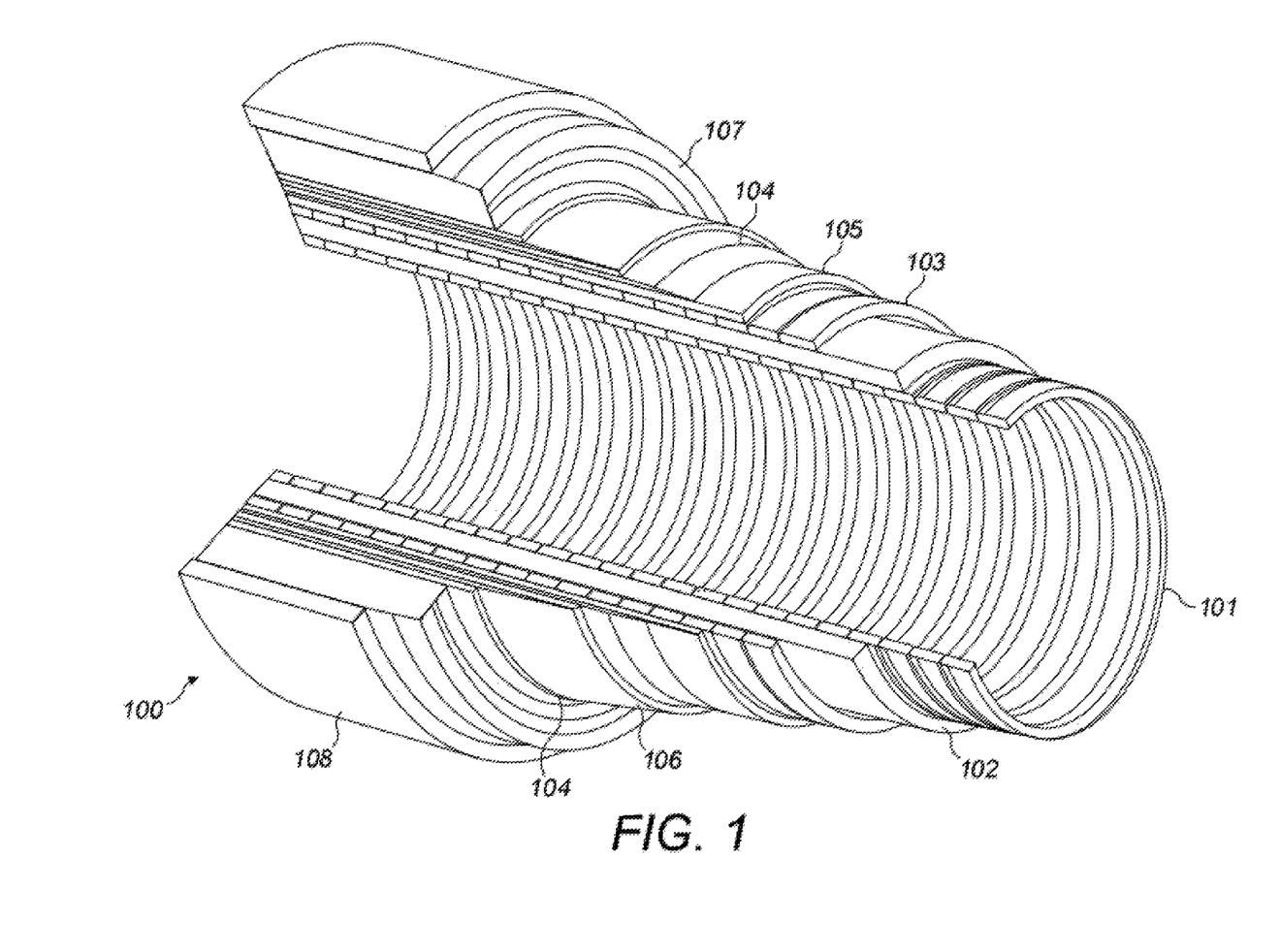
FIG. 1 illustrates a flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although an unbonded pipe formed from a number of particular layers is illustrated in FIG. 1, it is to be understood that the present invention is broadly applicable to other unbonded or bonded pipe structures manufactured from a variety of possible materials. For example, the present invention is broadly applicable to the constructions of unbonded pipes described in Table 1 of API Recommended Practice 17B, 5$^{th}$ Edition.

For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments of the present invention are applicable to 'smooth bore' operations (i.e. without a carcass layer) as well as such 'rough bore' applications (with a carcass layer).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
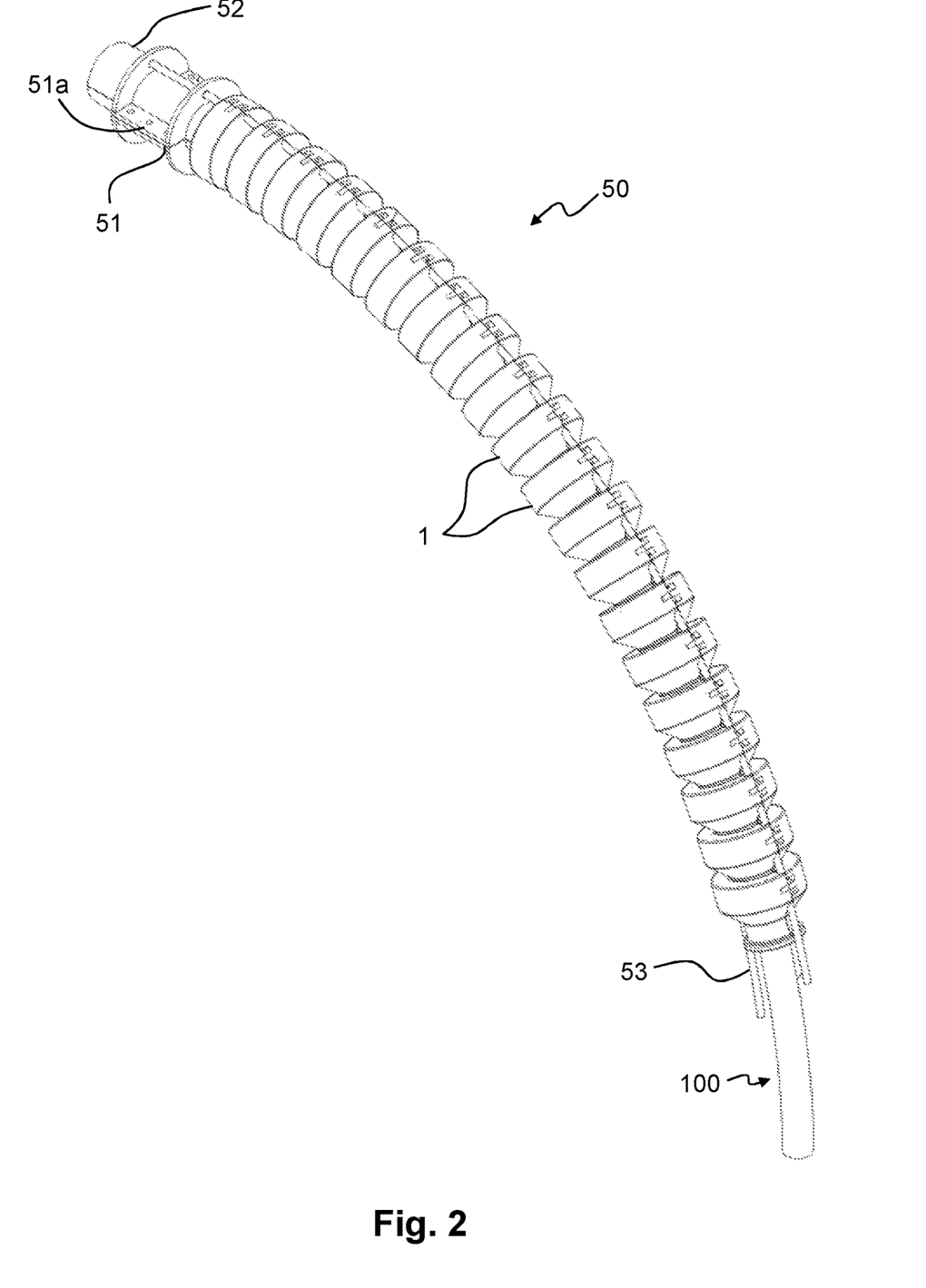
FIG. 2 illustrates a perspective view of a bend restrictor installed around a flexible pipe body.

FIG. 2 illustrates a bend restrictor 50 installed around a flexible pipe body 100, where the bend restrictor 50 is configured to mechanically restrain the flexible pipe body 100 to thereby prevent it from bending beyond its minimum bend radius.

The bend restrictor 50 includes a plurality of interlinked bend restrictor elements 1 which are secured to the flexible pipe body 100 by a securement device 51, which is a reaction collar 51 in this embodiment. The reaction collar 51 includes a pair of opposed grab bars 51a suitable for engagement by a human or mechanical operator. The reaction collar 51 is attached to an end fitting connection 52 by an attachment (not shown) as is well known to one skilled in the art. The bend restrictor 50 includes a removable joining member 53, which is in the form of an elongate locking rod in this embodiment. In other embodiments a flexible locking member may be used as the removable joining member 53.

Figure 3:
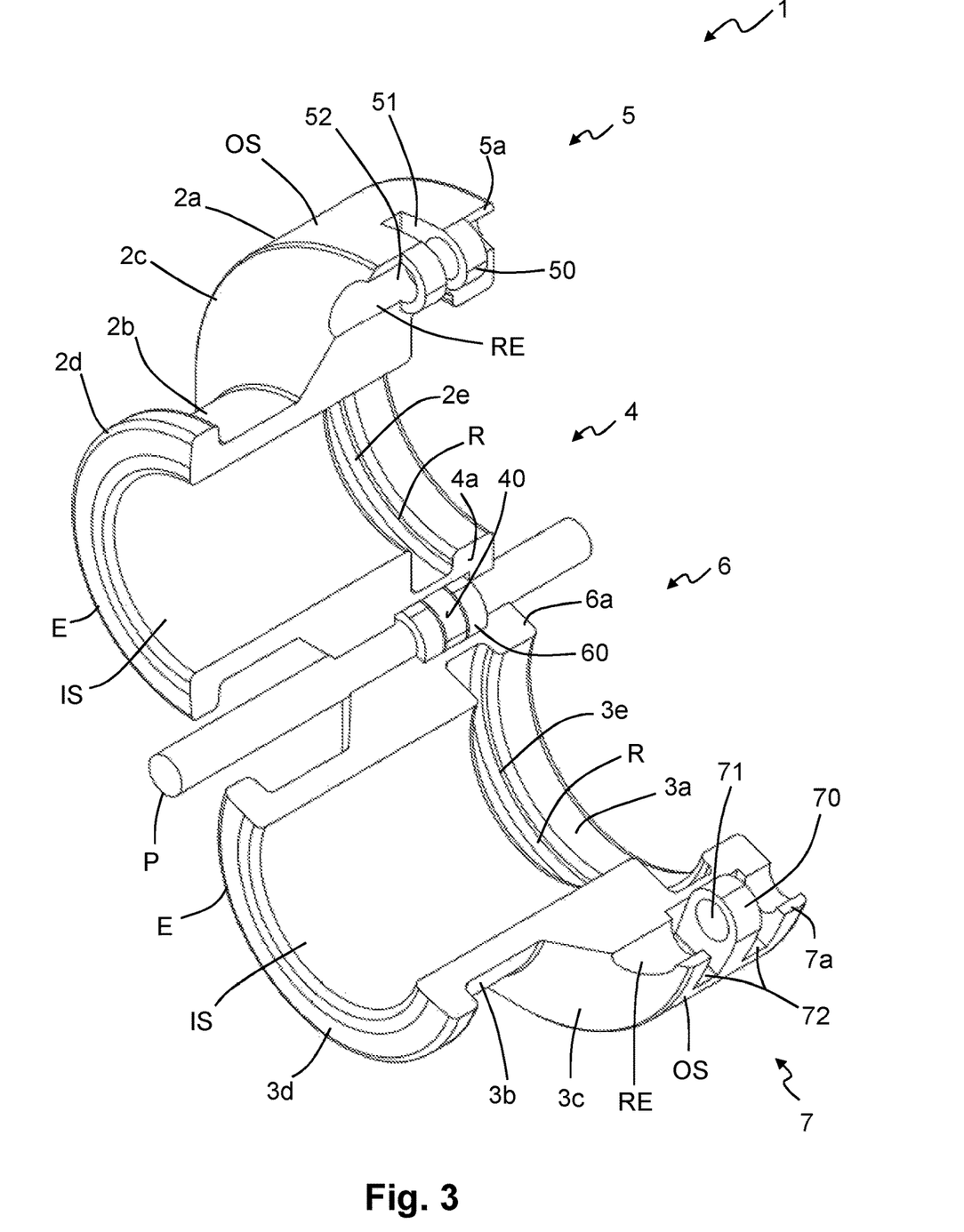
FIG. 3 illustrates a perspective view of a bend restrictor element for use in a bend restrictor.

FIG. 3 illustrates a bend restrictor element 1 suitable for use as a component of the bend restrictor 50 shown in FIG. 2, where the bend restrictor element 1 is shown in an open condition.

The bend restrictor element 1 includes first and second parts 2, 3 which are discrete parts in this embodiment. The first and second parts 2, 3 may be formed from metallic materials, polymers, creep resistant elastomers, glass fibre reinforced plastic, or the like.

Both first and second parts 2, 3 comprise an inner surface IS and an outer surface OS, where the inner surface IS is shaped such that, when the parts 2, 3 are coupled together in a closed condition, the bend restrictor element 1 forms a generally cylindrical shape. In the closed condition a longitudinal axis (not shown) is defined centrally along the generally cylindrical shape. As will be appreciated by one skilled in the art, the diameter of the generally cylindrical interior surface IS of the bend restrictor element 1 is selected according to the outer diameter of the flexible pipe body 100 with which it is intended to be used.

Each part 2, 3 comprises, respectively, along the longitudinal axis, a socket portion 2a, 3a and a head portion 2b, 3b connected by a connection portion 2c, 3c. The head portion 2b, 3b has an outer diameter which is less than that of the socket portion 2a, 3a. A flange 2d, 3d extends radially outwardly from the outer surface OS of the free end of each of the head portions 2b, 3b, forming an annular extension E when the parts 2, 3 are coupled together in a closed condition. Each of the socket portions 2a, 3a includes a semi-circular rebate 2e, 3e into its inner surface IS, which forms an annular rebate R when the parts 2, 3 are coupled together in a closed condition. The annular rebate R is sized and shaped to retain the annular extension E therewithin. Accordingly, a first bend restrictor element 1 may be interlinked with a second bend restrictor element 1 such that longitudinal movement between the two bend restrictor elements 1 is substantially prevented by engagement of extension E within rebate R.

The first part 2 comprises a first joining portion 4 at a first longitudinal edge 4a and a second joining portion 5 at a second longitudinal edge. The first joining portion 4 comprises a longitudinally extending projection 40 from the first longitudinal edge 4a with a passageway (not shown) extending longitudinally through the projection 40. A pair of slots (not shown) extend, one on either side of the projection 40, into the first joining portion 4, in a direction transverse to the longitudinal axis, and beyond the first longitudinal edge 4a. The second joining portion 5 comprises a longitudinally extending projection 50 from the second longitudinal edge 5a of the first part 2. A rebated slot 51 extends through the projection 50, part-way along its length, in a direction transverse to the longitudinal axis and extends beyond the second longitudinal edge 5a. A passageway 52 extends longitudinally through the projection 50.

The second part 3 comprises a third joining portion 6 at a third longitudinal edge 6a and a fourth joining portion 7 at a fourth longitudinal edge 7a. The third joining portion 6 comprises a longitudinally extending projection 60 from the third longitudinal edge 6a, with a passageway (not shown) extending longitudinally through the projection 60. A rebated slot (not shown) extends through the projection 60, part-way along its length and in a direction transverse to the longitudinal axis. The slot has a longitudinal width configured to be just greater than the longitudinal width of the projection 40 of the first joining portion 4. The fourth joining portion 7 comprises a longitudinally extending projection 70 from the fourth longitudinal edge 7a of the second part 3. The projection 70 of the fourth joining portion 7 has a longitudinal width which is configured to be just less than the longitudinal width of the slot 51 through the projection 50 of the second joining portion 5. A passageway 71 extends longitudinally through the projection 70. A pair of slots 72 extend, one on either side of the projection 70, into the fourth joining portion 7, in a direction transverse to the longitudinal axis, and beyond the fourth longitudinal edge 7a.

The passageways through the projections 40, 60 of the first and third joining portions 4, 6 are of similar cross-sectional size and shape and are configured to align when the first and second parts 2, 3 are engaged together in a closed or pivotable condition. The passageways 52, 71 through the projections 50, 70 of the second and fourth joining portions 5, 7 are of similar cross-sectional size and shape and are configured to align when the element 1 is in the closed condition.

The longitudinal edges 4a, 5a, 6a, 7a of the first and second parts 2, 3 each comprise a recess RE extending longitudinally therealong. Each recess RE is aligned with the passageway 52, 71 through the projection(s) 40, 50, 60, 70 of each respective joining portion 4, 5, 6, 7. Each recess RE is configured to have a minimum diametric dimension at least equal to the maximum diametric dimension of the passageway 52, 71 with which it is aligned.

In embodiments, the first part 2 and the second part 3 may comprise the same shape. Advantageously, the expense of manufacture of the bend restrictor element 1 may be relatively reduced, for example through only requiring the formation of tooling, such as dies, for one part instead of two.

The first and second parts 2, 3 of the bend restrictor element 1 are pivotably joined together by a pivot pin P. The pivot pin P has a cylindrical body which provides a pivot surface.

The pivot pin P is disposed through the aligned passageways of the first and third joining portions 4, 6, whereby the first part 2 is pivotably retained relative to the second part 3 about the pivot pin P. When the pivot pin P is disposed through the aligned passageways of the first and third joining portions 4, 6 the projections 40, 60 act to tether the first and second parts 2, 3 relatively adjacent one another. The pivot pin P may be disposed permanently or temporarily (e.g. removably) within the aligned passageways of the first and third joining portions 4, 6.

The pivot pin P extends also through the recesses RE. Advantageously, the recesses RE of the first and third joining portions 4, 6, when in an opposed condition (e.g. a closed condition) are configured to, together, define a minimum diametric dimension greater than the maximum diametric dimension of the pivot pin P. The recesses RE of the second and fourth joining portions 5, 7, when in an opposed condition (e.g. a closed condition) are also configured to, together, define a minimum diametric dimension greater than the maximum diametric dimension of the removable joining member 53. Accordingly, when the bend restrictor element 1 is in a closed condition the longitudinal edges 4a, 5a, 6a, 7a of the two parts 2, 3 are directly adjacent one another and are preferably, although not necessarily, in contact with one another. Beneficially, such proximity between the longitudinal edges 4a, 5a, 6a, 7a provides enhanced rigidity to the bend restrictor element 1 which is thereby more able to resist forces applied thereto by a bent or bending flexible pipe body 100 therewithin or by any other means.

When they are joined together, the arrangement of the first and third joining portions 4, 6, as described above, provides an abutment for preventing or at least substantially mitigating relative longitudinal movement of the first part 2 with respect to the second part 3. The projection 40 of the first joining portion 4 engages within the slot of the third joining portion 6 while the projection 60 of the third joining portion 6 engages within the slots of the first joining portion 4. When coupled together the arrangement of the second and fourth joining portions 5, 7 provide an abutment for preventing or at least substantially mitigating relative longitudinal movement of the first part 2 with respect to the second part 3.

Installation of a bend restrictor 50 around a flexible pipe body 100 is typically undertaken prior to installation of the flexible pipe body 100 at a site of use and may also be prior to transport of said pipe body 100 to the site of use.

A bend restrictor element 1, with a pivot pin P disposed within the passageways of the first and third joining portions 4, 5, is adjusted into an open condition (for example as shown in FIG. 3) by relative rotation of the first and second parts 2, 3 about the pivot pin P. The bend restrictor element 1 is then positioned adjacent a flexible pipe body 100 and is moved into a closed condition around the flexible pipe body 100 by relative rotation of the first and second parts 2, 3 about the pivot pin P until the second and fourth joining portions 5, 7 align with each other. A removable joining member, which may comprise a bolt and nut or a locking pin or the like, is inserted through the aligned passageways 52, 71 of the second and fourth joining portions 5, 7. Where the removable joining member comprises a nut and bolt, the nut may then be secured to the bolt to secure it in place. In this way the bend restrictor element 1 is releasably coupled around the flexible pipe body 100.

Figure 4:
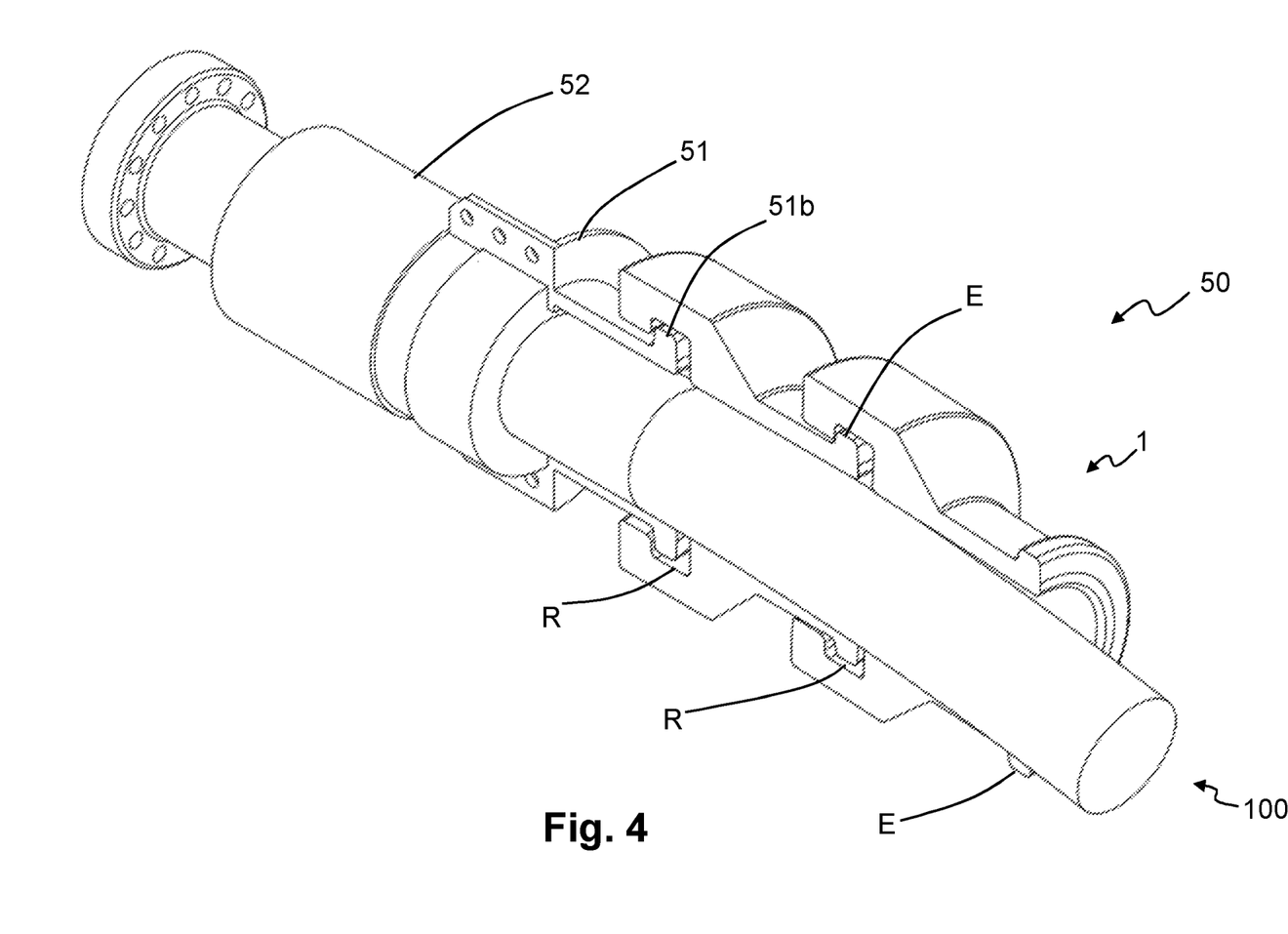
FIG. 4 illustrates a partial sectional view of an end portion of the bend restrictor illustrated in FIG. 2.

A further bend restrictor element 1 may then be installed around the flexible pipe body 100 in a manner similar to that described above in respect of the previous bend restrictor element 1. The further bend restrictor element 1 may be installed at a longitudinal location relative to the previous bend restrictor element 1 such that the annular extension E of the previous bend restrictor element 1 is engaged within the annular rebate R of the subsequent bend restrictor element 1 (see FIG. 4 for an illustration of interlinked bend restrictor elements 1). As many bend restrictor elements 1 as are determined to be necessary may be installed around the flexible pipe body 100 in this manner. The end bend restrictor element 1 may be secured to the reaction collar 51, for example to an annular flange 53 extending from one end of the reaction collar 51 which may be received within the annular recess R of the bend restrictor element 1.

In embodiments, a first bend restrictor element 1 may be positioned adjacent a flexible pipe body 100 in an open condition and then moved into a closed condition around the pipe body 100 by relative rotation of its first and second parts 2, 3 about its pivot pin P. A second bend restrictor element 1 may then be wrapped around the flexible pipe body 100 in the same manner such that the extension E of the first bend restrictor element 1 is engaged within the recess R of the second bend restrictor element 1. A removable joining member may then be inserted through the aligned passageways 52, 71 of the second and fourth joining portions 5, 7 of both the first and second bend restrictor elements 1. In this way, plural bend restrictor elements 1 may be releasably coupled together using a single removable joining member. It will be appreciated that the removable joining member should have a length suitable to extend between the bend restrictor elements 1 to accomplish releasable coupling thereof. Moreover, the removable joining member 53 may be formed from a flexible material and/or may comprise a flexible portion. Although only a first and second bend restrictor element 1 are described as being joined in this manner it will be appreciated by one skilled in the art that any suitable number of bend restrictor elements 1 may be joined in this manner, using a suitable length of removable joining member.

Removal of a bend restrictor 50 according to the invention from around a flexible pipe body 100 comprises the sequential removal of each bend restrictor element 1. Removal of a first bend restrictor element 1 comprises first removing the removable joining member from the aligned passageways 52, 71 of the second and fourth joining portions 5, 7. The first and second parts 2, 3 of the bend restrictor element 1 are then moved into an open position by relative pivoting of the parts 2, 3 about the pivot pin P. The open bend restrictor element 1 can then be moved axially away from the flexible pipe body 100. The same removal process may then be applied sequentially to each bend restrictor element 1 along the length of the bend restrictor 50 until the entire device has been removed from around the flexible pipe body 100.

In embodiments, the removable joining member 53 may extend between plural bend restrictor elements 1 in order to releasably couple any suitable number of bend restrictor elements 1 around the flexible pipe body 100. The plural bend restrictor elements may be successive bend restrictor elements in a bend restrictor. Alternatively, the plural bend restrictor elements may be every second, third or so on bend restrictor elements. For example, where a bend restrictor comprises elements $1_a$, $1_b$, $1_c$, $1_d$, $1_e$, ... $1_z$, two or more of the 'even' elements ($1_b$, $1_d$, ... $1_z$) may be connected by a first removable joining member whilst two or more of the 'odd' elements ($1_a$, $1_c$, $1_e$, ... $1_y$) may connected by a second removable joining member. In this configuration, the first removable joining member may extend through a rebate in the intervening 'odd' bend restrictor elements and the second removable joining member may extend through a rebate in the 'even' bend restrictor elements. The removable joining members may be displaced by, say 90° (or another angle above 0°, e.g. from 30 to 330°) with respect to one another around the bend restrictor. In that embodiment, although two removable joining members will need to be removed to uncouple those elements of the bend restrictor from the flexible pipe, the pull out force needed to remove each removable joining member may be reduced as compared to the force required to pull out a single removable joining member extending through a corresponding number of bend restrictor elements.

The removable joining member 53 may extend through plural bend restrictor elements, and where it does so uncoupling of the bend restrictor 50 from the flexible pipe will comprise removing the removable joining member 53 from the plural bend restrictor elements 1, where removal may be affected by pulling or pushing the removable joining member 53 in order to slidably remove it. In practice, the removable joining member is likely to be removed from the reaction collar end of the flexible pipe. In embodiments the removable joining member 53 may be configured to extend between each of the bend restrictor elements 1 in the bend restrictor 50, for example the removable joining member may have a length suitable to extend between each of the bend restrictor elements 1 in the bend restrictor 50. In such embodiments, removal of the single removable joining member may affect release of all of the bend restrictor elements 1 from around a flexible pipe body. In embodiments the pivot pin P may extend between plural bend restrictor elements 1 to provide relative pivotable rotation of the parts 2, 3 of each of the restrictor elements 1 through which the pin P extends, in which case the pivot pin P will have the necessary flexibility to allow the bend restrictor to bend as required in use.

In embodiments, the pivot pin P may comprise a removable joining member. In embodiments the pivot pin P may be replaced by any other suitable removable joining member. In embodiments, removal of the bend restrictor 50 from around a flexible pipe body 100 may comprise removing a releasable joining member 53 extending between plural bend restrictor elements 1 and/or removing a pivot pin P extending between plural bend restrictor elements 1. Removal of the or a releasable joining member or the or a pivot pin P may be dependent on the orientation of the flexible pipe body 100, for example the relative direction of a curve of the flexible pipe body 100 with respect to the location of the or a releasable joining member and the or a pivot pin P. In one embodiment, the flexible pipe body 100 may be bent such that a pivot pin P extending between plural bend restrictor elements 1 is located on portion of the bend restrictor 50 having a relatively greater radius of curvature than does the portion of the bend restrictor 50 where a releasable joining member extending between plural bend restrictor elements 1 is located. In such an orientation of the flexible pipe body 100 the bend restrictor 50 may be more readily and rapidly removed from around the pipe body 100 by removing the pivot pin P.

Figure 5:
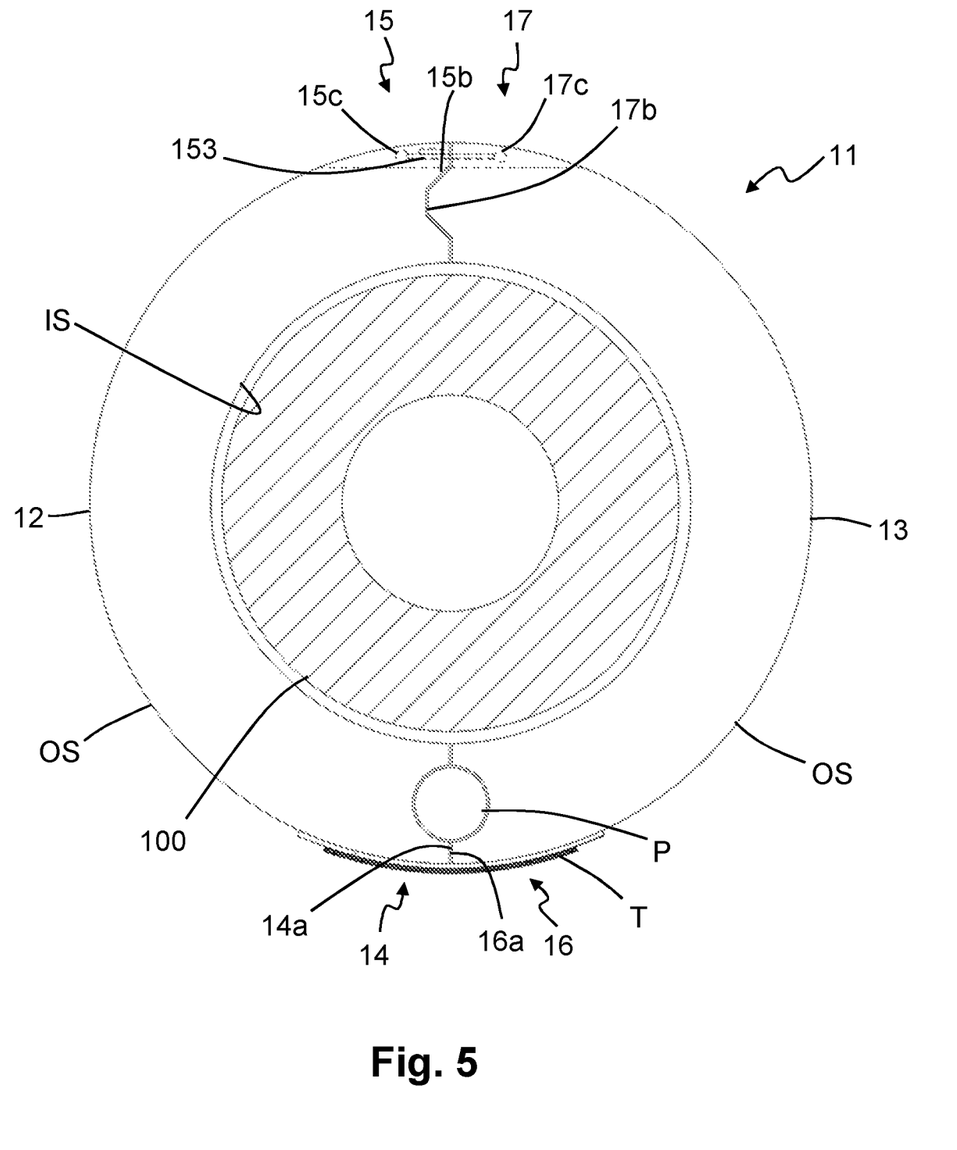
FIG. 5 illustrates a cross-sectional view of an alternative bend restrictor element for use in a bend restrictor.

FIG. 5 illustrates a bend restrictor element 11 suitable for use in the bend restrictor 50 shown in FIG. 2, wherein like features to those described in respect of the bend restrictor element 1 illustrated in FIG. 3 are provided with like references preceded by a '1', and will not be described herein further. The bend restrictor element 11 illustrated in FIG. 5 is shown in a closed condition.

The bend restrictor element 11 illustrated in FIG. 5 differs from the bend restrictor element 1 illustrated in FIG. 3 in that the first, second, third and fourth joining portions 14, 15, 16, 17 are absent longitudinally extending projections with longitudinally extending passageways therethrough. Instead, the bend restrictor element 11 illustrated in FIG. 5 comprises first and third joining portions 14, 16 shaped to at least partially encircle the pivot pin P. A tether element T is attached to the outer surface OS of both the first and second parts 12, 13 and extends across the first and third longitudinal edges 14a, 16a to tether the two parts 12, 13 together. The second and fourth joining portions 15, 17 comprise, respectively, an elongate longitudinally extending recess 15b and a co-operating elongate longitudinally extending projection 17b configured to engage within the recess 15b when the bend restrictor element 11 is in a closed condition. The second and fourth joining portions 15, 17 also each comprise longitudinal passageways 15c, 17c therethrough.

The tether element T is attached to the outer surface OS of both the first and second parts 12, 13, adjacent, respectively, the first joining portion 14 and the third joining portion 16. The tether element T is formed from flexible material, for example spring steel or a suitable polymer or the like. The tether element T is attached to the first and second parts 12, 13 by any suitable means, for example using adhesive and/or one or more fixings such as screws and the like.

Prior to installation on a site of use, the bend restrictor element 11 is moved into an open condition (from a closed condition) by pivoting the first and second parts 12, 13 relative to one another about the pivot pin P. The longitudinally extending projection 17b and the longitudinally extending recess 15b of, respectively, the fourth and second joining portions 17, 15 are thereby moved away from one another, such that the bend restrictor element 11 is moved into an open condition. The tether element T retains the first and second parts 12, 13 in close proximity to one another, acting as part of a hinge. Additionally, the tether element T acts to at least partially retain the pivot pin P adjacent the first and second parts 12, 13 when the bend restrictor element 11 is in the open condition.

The bend restrictor element 11 is then positioned adjacent a flexible pipe body 100 and is moved into a closed condition around the flexible pipe body 100 by relatively rotating the first and second parts 12, 13 about the pivot pin P until the second and fourth joining portions 15, 17 align with each other. In this closed condition the longitudinally extending projection 17b is received within the longitudinally extending recess 15b. A removable joining member 153 is then inserted through the longitudinal passageways 15c, 17c in the second and fourth joining portions 15, 17, thereby securing the bend restrictor element 11 in the closed condition (as shown in FIG. 5). The removable joining member 153 may comprise for example a rope, a cord or cable 153, for example which may be inserted through the longitudinal passageways 15c, 17c. In embodiments, the removable joining member 153 may be of any suitable type of sufficiently flexible material.

Installation of a bend restrictor 50 comprising bend restrictor elements 11 as illustrated in FIG. 5 requires the sequential installation of plural bend restrictor elements 11 in a sequential manner similar to that described in respect of the bend restrictor elements 1 illustrated in FIG. 3.

Removal of a bend restrictor 50 comprising bend restrictor elements 11 as illustrated in FIG. 5 is achieved by the sequential removal of the bend restrictor elements 11. In respect of a single bend restrictor element 11, first the removable joining member 153 is removed from the longitudinal passageways 15c, 17c in the second and fourth joining portions 15, 17. Then, the bend restrictor element 11 is moved into an open condition by relatively rotating the first and second parts 12, 13 about the pivot pin P such that the second and fourth joining portions 15, 17 move relatively apart from one another. The bend restrictor element 11 is then moved axially away from the flexible pipe body 100. The process is subsequently repeated for each bend restrictor element 11 in turn until the entire bend restrictor 50 has been removed from the flexible pipe body 100.

Various modifications to the detailed arrangements as described above are possible. For example, although the embodiment of the bend restrictor 50 shown in FIG. 2 is installed at an end of a flexible pipe body 100 this need not be the case and additionally or alternatively a bend restrictor 50 may be installed at any suitable location along a flexible pipe body 100. Additionally or alternatively, the bend restrictor 50 may be secured to a flexible pipe body 100 at both of its ends and/or intermediate said ends.

In embodiments, the bend restrictor element 1 illustrated in FIG. 3 may comprise a tether element T as described in respect of the bend restrictor element 11 illustrated in FIG. 5. In embodiments, the bend restrictor element 1 illustrated in FIG. 3 may comprise the first and third joining portions 14, 16 described in respect of the bend restrictor element 11 illustrated in FIG. 5. In embodiments, the bend restrictor element 1 illustrated in FIG. 3 may comprise the second and fourth joining portions 15, 17 described in respect of the bend restrictor element 11 illustrated in FIG. 5.

In embodiments, the first and second parts 2, 3, 12, 13 of the bend restrictor element 1, 11 may comprise a unitary structure. The bend restrictor element 1, 11 may comprise a living hinge, for example where a longitudinally extending portion of material connecting the two parts 2, 3, 12, 13 may be relatively thinned and/or flexible in order to provide a pivotable region. Where the bend restrictor element 1, 11 comprises a unitary structure the pivot pin P may not be included.

In embodiments, the bend restrictor 50 and/or one or more bend restrictor elements 1, 11 may be positively buoyant. For example, the first and/or second parts 2, 3, 12, 13 of the bend restrictor element 1, 11 may comprise a buoyancy means or device, for example configured to at least partially mitigate against sinking of the bend restrictor element 1, 11 within a body of fluid (e.g. water) when the bend restrictor element 1, 11 has been removed from around a flexible pipe body 100. Advantageously, in this way, the bend restrictor element 1, 11 may be more easily and rapidly transported to the surface of the body of fluid (e.g. water). The buoyancy means or device may comprise a portion of one or both of the first and second parts 2, 3, 12, 13. The buoyancy means or device may comprise a compartment within or attached to the first and/or second part 2, 3, 12, 13. For example, the buoyancy means or device may comprise a compartment within the socket portion 2a, 3a of the first and second parts 2, 3, 12, 13. The compartment may be sealed in a fluid tight manner and may be configured to retain therein a material which is relatively less dense than the fluid of the body of fluid within which the bend restrictor element 1, 11 is intended to be disposed (for example less dense than water). In embodiments the compartment may be configured to contain air or the like. In embodiments the compartment may be configured to contain a vacuum and to prevent the ingress of fluids thereinto.

In embodiments, two or more bend restrictor elements 1, 11 may be tethered together, for example by a tether. The tether may be formed from a flexible material and may be attached to some or all of the bend restrictor elements 1, 11 by any suitable means.

In embodiments, plural bend restrictor elements 1, 11 may be secured into a closed condition by a single removable joining member, for example which may extend between the plural bend restrictor elements 1, 11. The removable joining member may comprise an elongate joining member, for example which may be flexible. In embodiments, the removable joining member may comprise a cord or cable or rope or rod or the like. Removal of a bend restrictor 50 from around a flexible pipe body 100 may comprise slidably removing the removable joining member from plural bend restrictor elements 1, 11, for example pulling or pushing the removable joining member in a generally longitudinal direction relative to the flexible pipe body 100. Such pulling or pushing may be achieved by a remotely operated vehicle (ROV) and/or a human operator. In this way plural bend restrictor elements 1, 11 may be removed from around a flexible pipe body 100 through the removal of a single removable joining member. Where the removable joining member comprises a cord or cable or rope, installation of the bend restrictor 50 and/or bend restrictor element 1, 11 may comprise securing one or both ends of the cord or cable or rope relative to the bend restrictor 50 or a further object. Removal of the removable joining member (where it comprises a cord or cable or rope) may comprise severing (e.g. cutting) a portion of the removable joining member.

In embodiments, a pivot pin may extend between plural bend restrictor elements 1, 11 such that the plural bend restrictor elements 1, 11 are each pivotable about the pivot pin between an open and a closed condition.

In embodiments, bend restrictor element(s) 1, 11 and/or a bend restrictor 50 may be removed from around a flexible pipe body 100 by a human operator (such as a diver, when the bend restrictor element(s) 1, 11 are in a sub-sea location) or by a mechanical operator (such as a ROV).

With the above-described arrangement, a bend restrictor 50 and/or a bend restrictor element 1, 11 is more readily and rapidly installable around a flexible pipe body 100 (or other suitable elongate member).

With the above-described arrangement, a bend restrictor 50 and/or a bend restrictor element 1, 11 is more readily and rapidly removeable from around a flexible pipe body 100 (or other suitable elongate member).

With the above-described arrangement, a bend restrictor element 1, 11 and/or a bend restrictor 50 may be removed from around a flexible pipe body 100 even when it is located in a remote environment and/or in an environment presenting impaired accessibility. For example, where a bend restrictor 50 is installed around a flexible pipe body 100 which is installed at a sub-sea location the bend restrictor 50 may be readily and rapidly removed from around the flexible pipe body 100. Removal may be accomplished by a human operator, for example by a diver and/or by a mechanical means or device, for example by a ROV. With the above-described arrangement, a bend restrictor element 1, 11 and/or a bend restrictor 50 may be removed from around a flexible pipe body 100 even when it is located deep underwater.

With the above-described arrangement, a bend restrictor 50 and/or bend restrictor element 1, 11 may be removed from around a flexible pipe body 100 at a sub-sea location and be more easily and rapidly transported to a surface location. Moreover, where one or more of the bend restrictor elements 1, 11 comprise a buoyancy means or device, the bend restrictor 50 and/or one or more bend restrictor elements 1, 11 may be transported to a surface location automatically (e.g. without further effort from a human or mechanical operator) following removal from around a flexible pipe body 100. Furthermore, where a tether is provided between some or all of the bend restrictor elements 1, 11, a bend restrictor 50 may be more easily collected and transported subsequent to its removal from around a flexible pipe body 100.

In prior art pipes have to be over-engineered to cope with degradation of the materials of construction caused by the insulating effect of a bend restrictor therearound. Removability of a bend restrictor means that pipes can be designed for their purpose and may, therefore, be formed from materials having a relatively lower maximum operating temperature and/or of a relatively reduced thickness which may consequently be less expensive than pipes made according to the prior art.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A bend restrictor comprising:
   two or more elements; and
   a removable joining member;
   wherein each element comprises a first part and a second part;
   wherein together the first and second parts of each element provide a cavity for receipt of a flexible pipe, in use;
   wherein the first and second parts of each element are pivotably connected together at a first portion thereof, and releasably coupled or couplable together at a second portion thereof by the removable joining member;
   wherein the first and second parts of at least two of the elements are pivotably connected along a common pivot axis; and
   wherein the removable joining member extends between at least two of the elements, thereby releasably coupling the first and second parts of each element together.

2. The bend restrictor according to claim 1, wherein one or both of the first portion and the second portion of the first part of each element comprise a projection;
   wherein one or both of the first portion and the second portion of the second part of each element comprise a rebate, respectively; and
   wherein each respective projection is configured to be received or receivable within the respective rebate when the first and second parts are releasably coupled together.

3. The bend restrictor according to claim 1, wherein one or both of the first portion and the second portion of the second part of each element comprises at least one projection.

4. The bend restrictor according to claim 1, wherein one or both of the first portion and the second portion of the first part comprises at least one rebate.

5. The bend restrictor according to claim 1, wherein one or both of the first portion and the second portion of one or both of the first part and the second part of each element comprises a projection; and
   wherein a passageway extends through each projection.

6. The bend restrictor according to claim 5, wherein each passageway extends in a direction along the cavity.

7. The bend restrictor according to claim 5, wherein at least a portion of the passageways are aligned with one another; and
   wherein the removable joining member is received or receivable within the aligned passageways.

8. The bend restrictor according to claim 7, wherein the removable joining member is configured to provide or allow the pivotal connection of the first and second parts or the releasable coupling of the first and second parts.

9. The bend restrictor according to claim 7, wherein the removable joining member is an elongate flexible or rigid body.

10. The bend restrictor according to claim 1, wherein one or both of the first portion and the second portion of one or both of the first part and the second part of each element comprise a projection;
    wherein a passageway extends through each projection; and
    wherein at least a portion of the passageways are aligned with one another when the first and second parts are releasably coupled together.

11. The bend restrictor according to claim 1 further comprising disengagable securing means to provide or allow the releasable coupling of the first and second parts of each element.

12. The bend restrictor according to claim 11, wherein the disengagable securing means is selected from the group consisting of a lock, latch, rope, cable and catch mechanism.

13. The bend restrictor according to claim 1, wherein one or both of the first portion and the second portion of one or both of the first part and the second part of each element comprise a projection;
    wherein a passageway extends through each projection;
    wherein at least a portion of the passageways are aligned with one another; and
    wherein at least one removable joining member extends between aligned passageways of each element, thereby releasably coupling the first and second parts of each element together.

14. The bend restrictor according to claim 13, wherein at least one removable joining member is flexible.

15. The bend restrictor according to claim 1, wherein the elements are successive elements of the bend restrictor.

16. A method of deploying a flexible pipe comprising:
    securing the bend restrictor according to claim 1 around a pipe or pipe segment;
    locating the pipe or pipe segment at a desired sub-sea location; and
    removing the bend restrictor.

17. The method of claim 16, wherein removing the bend restrictor comprises removing the removable joining member from one or more elements of the bend restrictor to allow parts of the one or more element to pivot apart from one another.

18. The method of claim 16, wherein removing the bend restrictor comprises removing the removable joining member from one or more elements of the bend restrictor in a direction parallel to the pipe or pipe segment about which the one or more bend restrictor elements are disposed.

* * * * *